Jan. 18, 1966   W. A. FERRARI ETAL   3,229,832
LOADING AND EJECTING MECHANISM FOR REFUSE VEHICLES
Filed April 17, 1964   6 Sheets-Sheet 1

William A. Ferrari
Orin M. Anderson
Francis H. Dean
INVENTORS

BY Charles E. Lightfoot
ATTORNEY

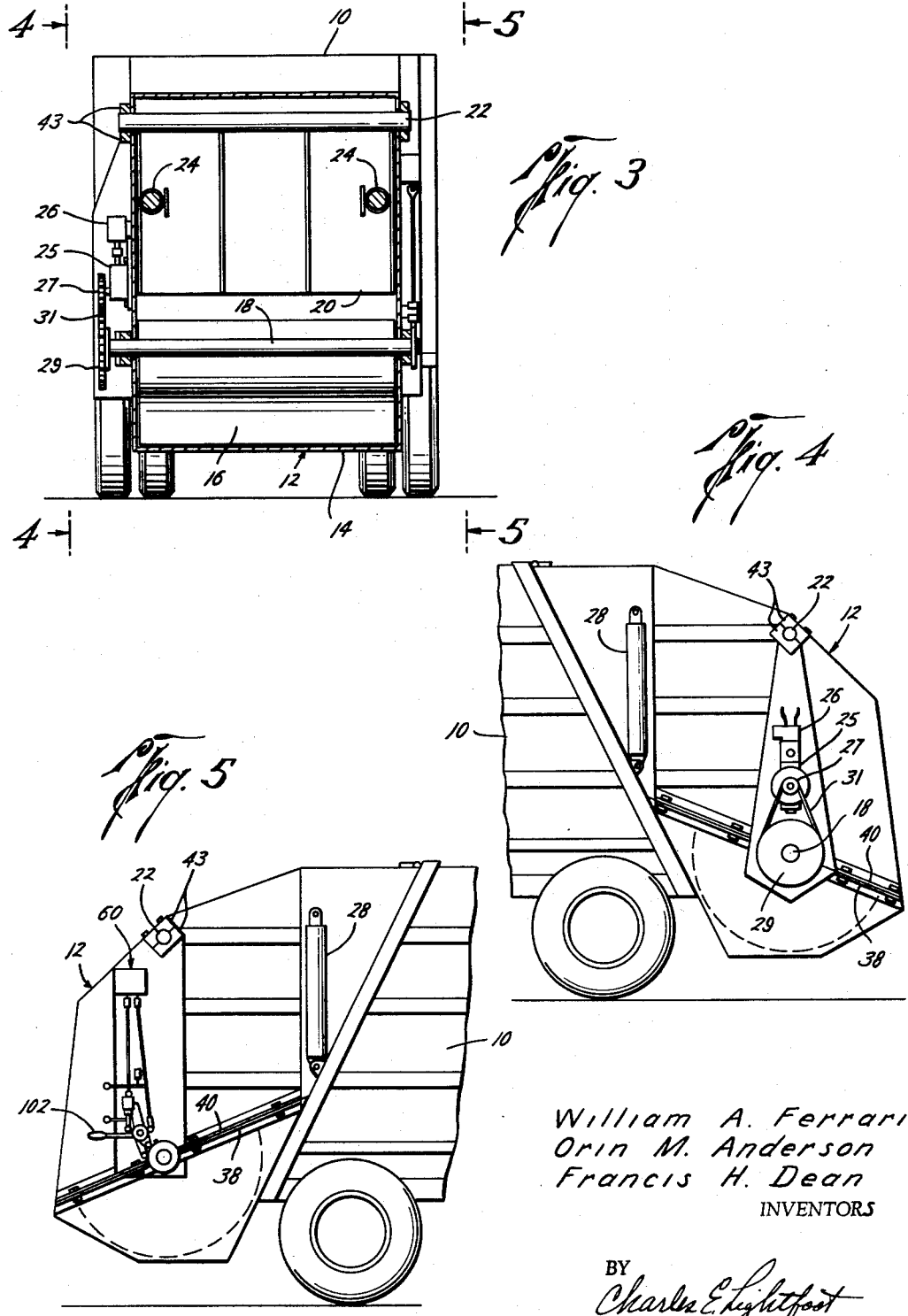

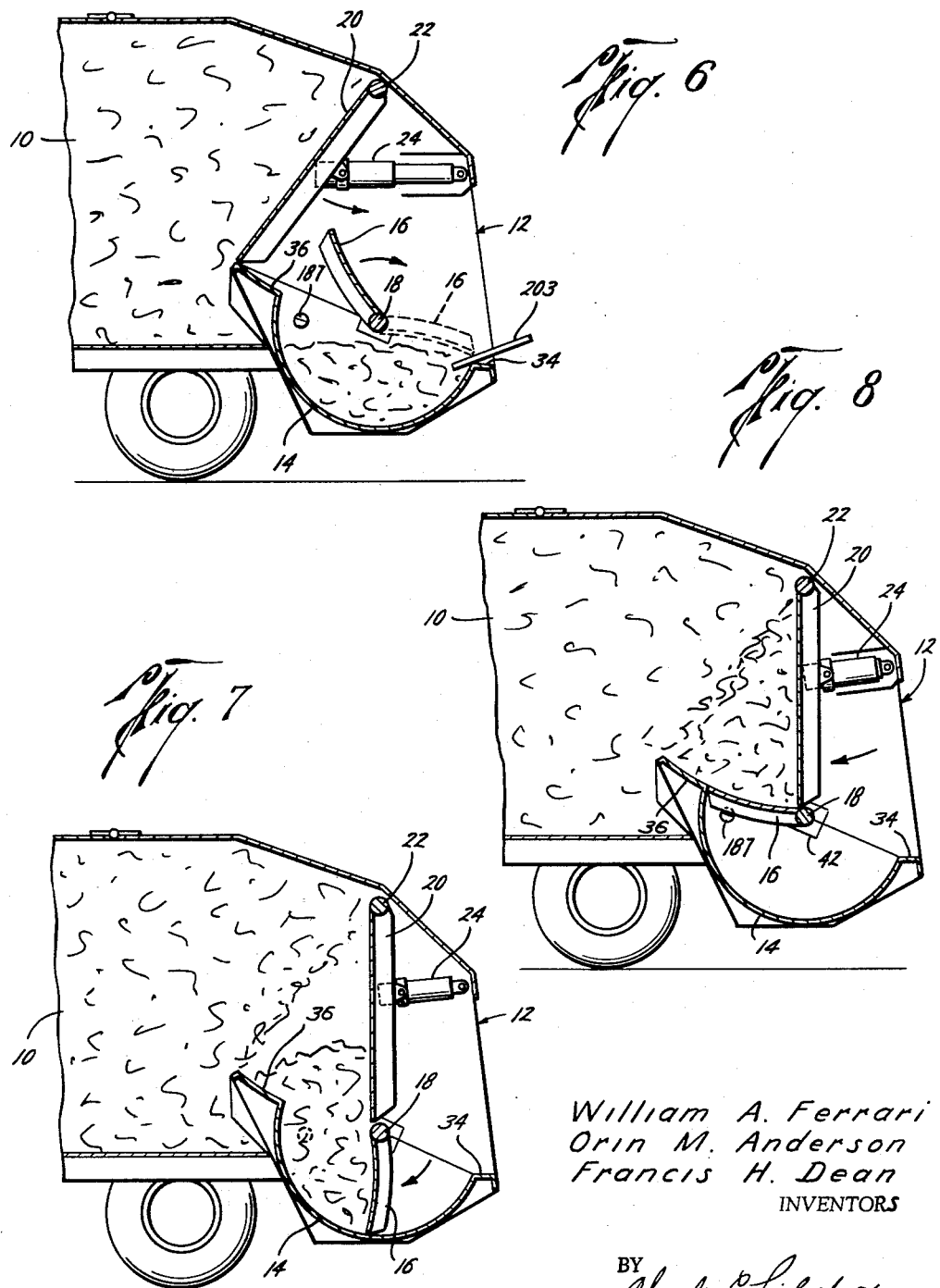

Jan. 18, 1966 W. A. FERRARI ETAL 3,229,832
LOADING AND EJECTING MECHANISM FOR REFUSE VEHICLES
Filed April 17, 1964 6 Sheets-Sheet 4
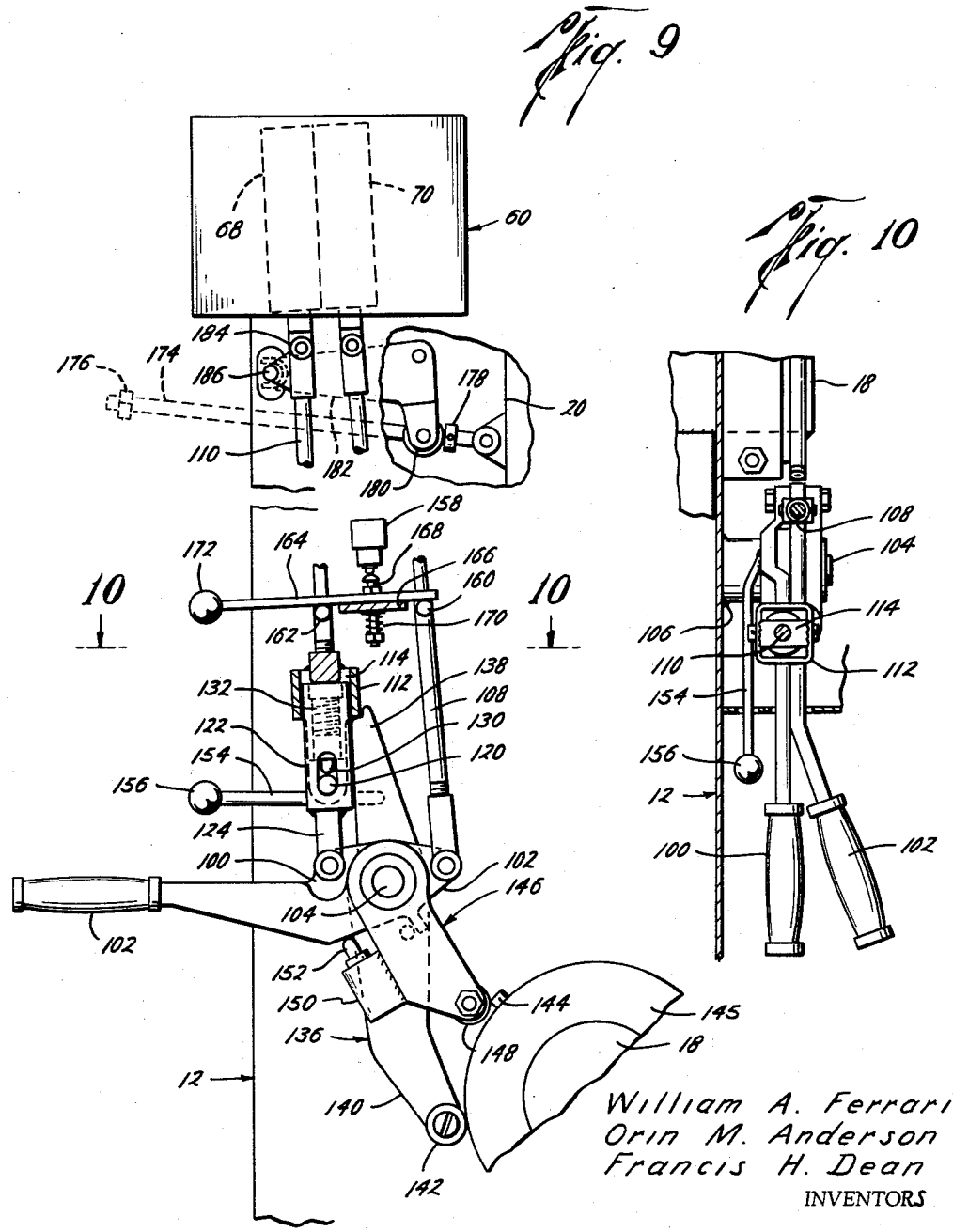
William A. Ferrari
Orin M. Anderson
Francis H. Dean
INVENTORS
BY
ATTORNEY

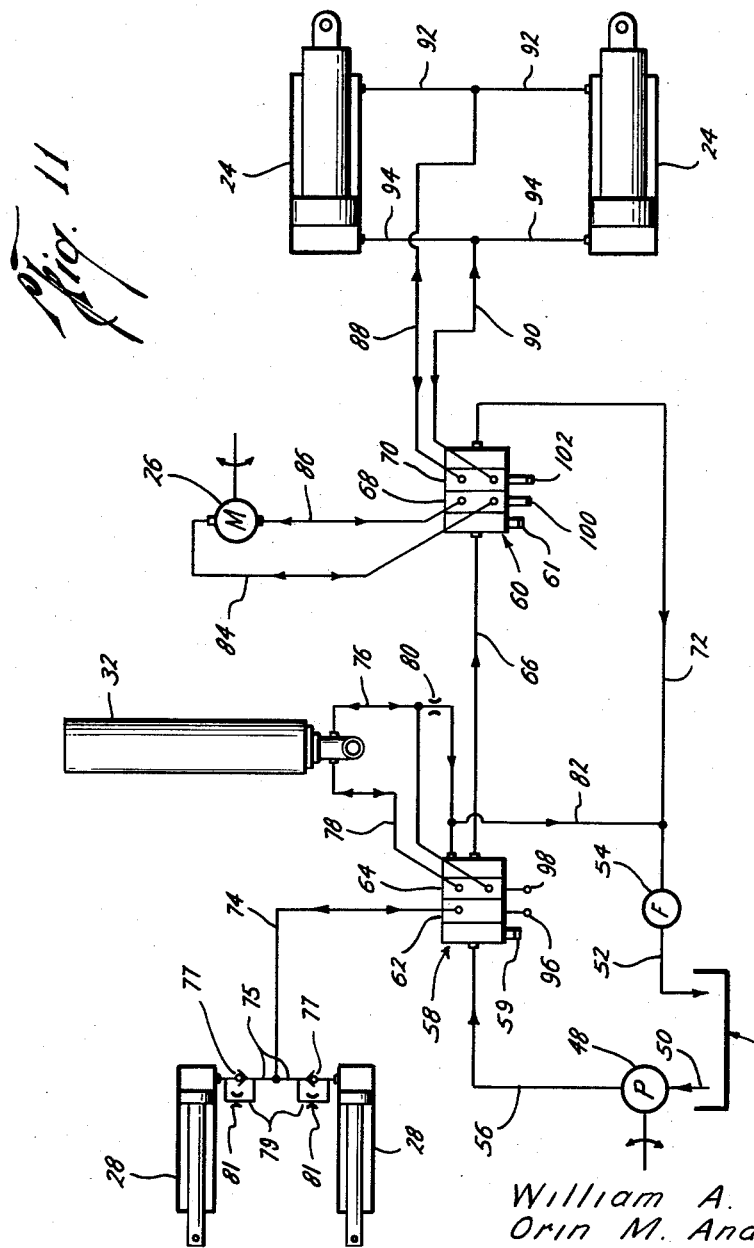

Jan. 18, 1966 W. A. FERRARI ETAL 3,229,832
LOADING AND EJECTING MECHANISM FOR REFUSE VEHICLES
Filed April 17, 1964 6 Sheets-Sheet 6

William A. Ferrari
Oran M. Anderson
Francis H. Dean
INVENTORS

BY Charles E. Lightfoot
ATTORNEY

United States Patent Office 3,229,832
Patented Jan. 18, 1966

3,229,832
LOADING AND EJECTING MECHANISM FOR REFUSE VEHICLES
William A. Ferrari, 642 Cave Lane, and Orin M. Anderson, 224 Glenarm, both of San Antonio, Tex., and Francis H. Dean, 5130 Beechnut, Houston, Tex.
Filed Apr. 17, 1964, Ser. No. 360,526
10 Claims. (Cl. 214—83.3)

This invention relates to refuse disposal vechicles and more particularly to refuse loading and ejecting mechanism for such vehicles.

The invention has to do with refuse vehicles of the rear loading type having a tail gate assembly including a loading hopper, sweep panel means for elevating the refuse in the hopper to a position for packing into the vehicle body, and ram panel mechanism by which the refuse is moved forwardly from the sweep panel into the vehicle, and also having ejector mechanism by which the refuse is unloaded rearwardly from the vehicle.

The invention has for an important object the provision in a refuse vehicle of the type referred to of a simplified hydraulically operated mechanism through which the movements of the sweep panel and ram panel may be coordinated by means of a series type of flow system for operation in a predetermined sequence to assure that there will be no interference between these elements in the loading of refuse into the vehicle.

Another object of the invention is to provide hydraulically operated mechanism by which the sweep panel and ram panel may be operated automatically in a predetermined sequence through a simplified series flow system and including means whereby such mechanism may be manually controlled through other than the series flow system to operate the panels out of such predetermined sequence or to arrest the movement of the panels in any position if desired.

A further object of the invention is the provision of loading mechanism for a refuse vehicle of the kind mentioned which, by reason of a simplified series flow system is constructed to substantially reduce the danger of injury to the operators during the loading of the vehicle.

Another object of the invention is to provide loading mechanism of the type referred to which is constructed to facilitate the removal and replacement of parts for purposes of maintenance and repair of the equipment.

A still further object of the invention is to provide a refuse vehicle having loading and unloading mechanism which is of rugged construction capable of withstanding the extreme conditions of hard usage and exposure to which such equipment is usualy subjected.

The above and other important advantages of the invention will be apparent from the following detailed description of the structure and mode of operation thereof when considered in conjunction with the annexed drawings, wherein:

FIGURE 3 is a cross-sectional view taken along the line 3—3 of FIGURE 1, looking in the direction indicated by the arrows;

FIGURE 4 is a fragmentary side elevational view looking at the left side of the rear end portion of the vehicle, showing details of the structure and operating mechanism of the tail gate assembly of the invention;

FIGURE 5 is a view similar to that of FIGURE 4, looking at the right side of the rear end portion of the vehicle, showing the location and arrangement of the control mechanism of the tail gate assembly;

FIGURE 6 is a fragmentary, central, longitudinal, cross-sectional view of the tail gate assembly showing the sweep and ram panels of the loading mechanism immediately after the end of the loading sequence of operation of the panels;

FIGURE 7 is a view similar to that of FIGURE 6 showing the sweep and ram panels in a stage of the loading sequence of their operation shortly after the commencement of the loading sequence;

FIGURE 8 is a view similar to that of FIGURE 6 showing the sweep panel at the limit of its loading movement and the ram panel at the start of its loading movement shortly before the end of the loading sequence;

FIGURE 9 is a fragmentary side elevational view, on an enlarged scale showing details of the structure of the control mechanism of the sweep and ram panel mechanism of the invention;

FIGURE 10 is a cross-sectional view, taken along the line 10—10 of FIGURE 9, looking in the direction indicated by the arrows;

FIGURE 11 is a schematic view of the hydraulic system and control mechanism thereof for the operation of the sweep and ram panels and the load ejecting mechanism.

Figure 1:
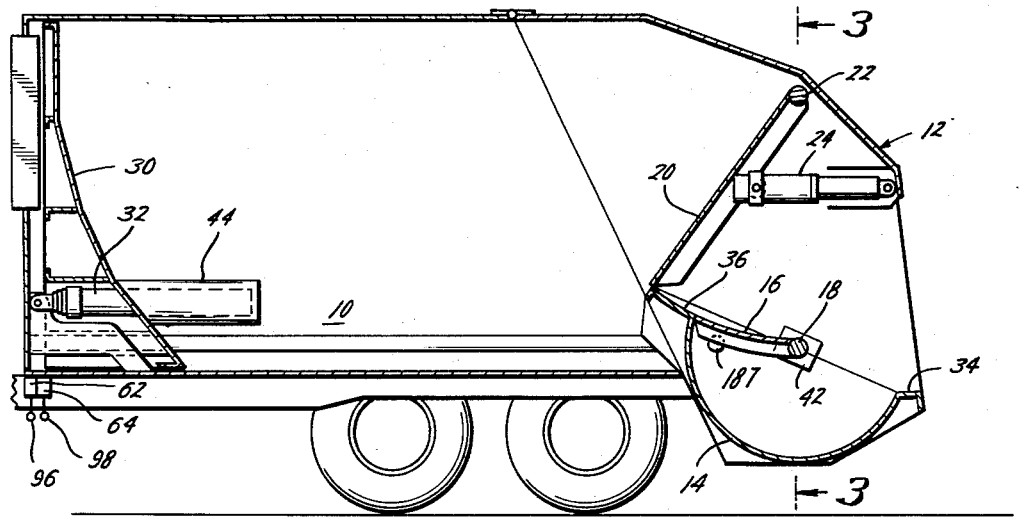
FIGURE 1 is a fragmentary side elevational view, partly in cross-section illustrating the invention and showing the vehicle with the tail gate assembly closed and the loading and ejecting mechanism positioned for the commencement of the loading operation.

Referring now to the drawings in greater detail, the numeral 10 designates generally the body of a refuse vehicle having a tail gate assembly generally designated 12 which closes the rear end of the body and which is hingedly connected thereto at the top to allow the body to be opened by lifting of the assembly.

The tail gate assembly includes an upwardly opening, horizontally extending, refuse receiving hopper or trough 14 having a rounded bottom, a sweep panel 16, carried by a horizontally extending rotatably mounted shaft 18 whose axis is located substantially at the axis of the curved bottom of the hopper 14 and a ram panel 20 mounted for swinging movement about a horizontal shaft 22 at the upper end of the ram panel.

The ram panel 20 is connected to hydraulic cylinders 24 by which the ram panel is moved back and forth about the axis of the shaft 22 and the sweep panel 16 is rotated with the shaft 18 by means of a reversible hydraulic motor 26 through suitable mechanism such as the right angle drive 25 and gears 27 and 29 about which a gear chain 31 passes. The tail gate assembly is adapted to be raised and lowered by hydraulic cylinders 28.

Figure 2:
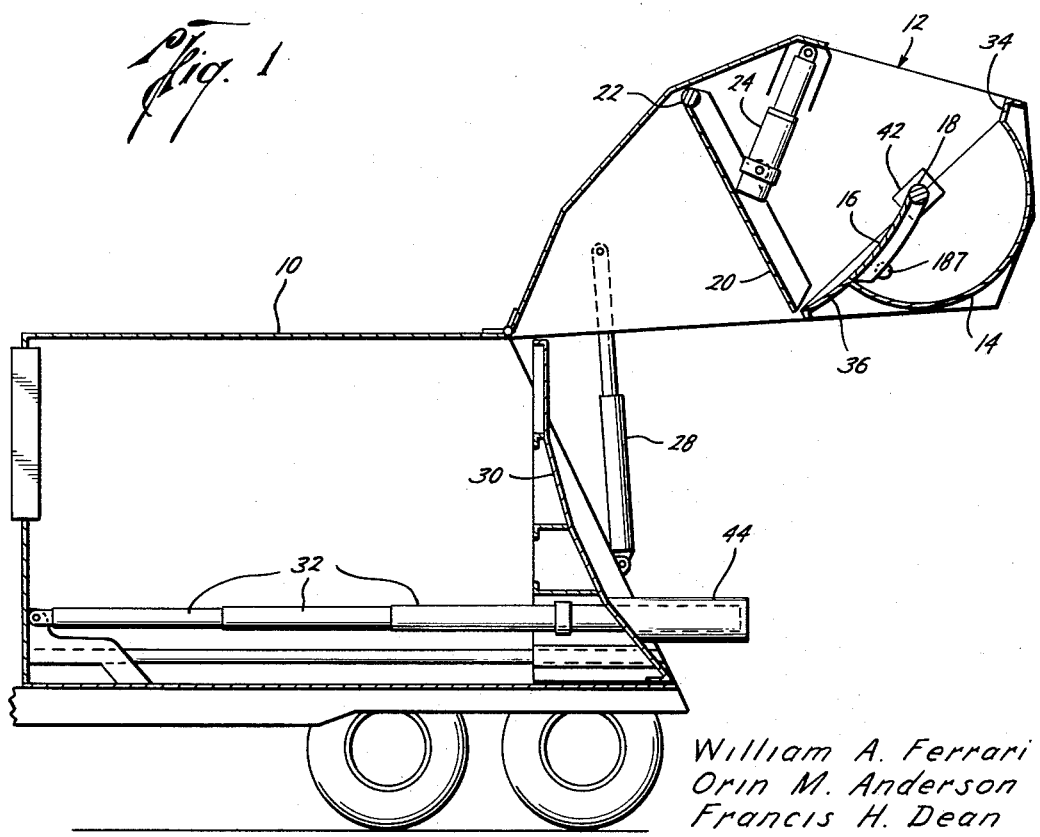
FIGURE 2 is a view similar to that of FIGURE 1 showing the vehicle with the tail gate assembly in elevated or open position and the ejecting mechanism at the limit of its ejecting movement in the unloading of the vehicle.

Within the body 10 an upright ejector panel or blade 30 is mounted for horizontal movement therein by means of the telescoping cylinders 32 to allow the blade to be moved to a forward position, shown in FIGURE 1, to permit the body to be fully loaded with the tail gate assembly lowered, and to a rearmost position, shown in FIGURE 2, to eject the load when the tail gate assembly is elevated.

The loading trough 14 has an outer rim portion 34 extending longitudinally along its outer edge, and an inner upwardly sloping, marginal portion 36 extending longitudinally along its inner edge, over which the refuse is moved into the vehicle by the ram panel 20. The loading trough 14 is formed as a separate unit which may be secured to the upper portion of the tail gate housing as by means of external flanges 38 and 40 on the trough and gate at the opposite sides of the assembly, so that the trough may be conveniently detached and replaced for purposes of repair.

The sweep panel 16 may be somewhat curved and is of a size to just clear the curved bottom of the loading trough and the sides of the tail gate, so that the sweep panel will sweep refuse out of the trough onto the sloping margin 36 as the sweep panel rotates with the shaft 18 to position the refuse to be loaded into the body by the ram panel 20 as the same swings inwardly across this marginal surface. The sweep panel is preferably welded along one longitudinal edge to the shaft 18, to form a unitary structure, the ends of the shaft extending somewhat beyond the ends of the panel and being journalled in suitable bearing supports 42, each of which is made in two parts, one carried by the trough end and the other carried by the trough end, so that the entire sweep panel and its shaft may be readily removed for replacement.

The sequence or cycle of operation of the sweep panel and ram panel is illustrated in FIGURES 6, 7 and 8, the sweep panel having a rotational movement of 360 degrees, while the ram panel swings horizontally back and forth from an advanced or forward position, shown in FIGURE 6, to a retracted or rear position, shown in FIGURES 7 and 8. As seen in FIGURE 6, the ram panel 20 is in its foremost position preparatory to a retracting movement, while the sweep panel 16 is in a position of partial return from refuse supporting or loading position to the position shown in dotted lines where the sweep panel begins another sweep movement to lift refuse from the trough 14 to the loading position of FIGURE 8. The ram panel 20 does not begin its retracting movement from the position of FIGURE 6 until the sweep panel has moved from the refuse supporting position of FIGURE 8 to the position shown in solid lines in FIGURE 6, so that the ram panel follows the return movement of the sweep panel without striking or engaging the sweep panel. The ram panel does not reach its fully retracted position, as seen in FIGURE 7, until the sweep panel has completed its return movement. When the sweep panel has reached the limit of its refuse lifting movement, to support the refuse for movement off of the sweep panel onto the marginal surface 36 and into the body, as seen in FIGURE 8, the ram panel then moves forward over the sweep panel to the position of FIGURE 1 to lift the refuse into the body.

The ejector plate or panel 30 is preferably curved downwardly and rearwardly so that the lower edge of the panel will be at least flush with the rear opening of the body, as shown in FIGURE 2, to assure the complete removal of the refuse from the body without any necessity for tilting the body during unloading of the same. The ejector panel is provided with a rearwardly extending horizontal housing or enclosure 44 within which the telescoping cylinders 32 extend when the ejector is at the limit of its forward movement in the body, to allow the ejector to be moved substantially to the forward end of the body, as seen in FIGURE 1, when loading the vehicle.

The hydraulic system of the invention is illustrated diagrammatically in FIGURE 11, wherein the numeral 46 designates a fluid supply reservoir for the system whose outlet is connected to the inlet of a pump 48, through a supply pipe 50, there being also a return pipe 52 through which fluid may return to the reservoir. The return line 52 may be provided with a suitable filter 54 of usual construction.

The pump 48 has a discharge pipe 56 through which fluid under pressure is supplied to the various components of the system under the control of the two central valve assemblies generally designated 58 and 60. Valve assembly 58 has control valves 62 and 64 through which fluid may flow to the assembly 60 through a pipe 66 when the valves 62 and 64 are in their neutral positions and the assembly 60 has central valves 68 and 70 through which fluid may flow back through pipes 72 and 52 to the reservoir 46 when valves 68 and 70 are in their neutral positions. The valve 62 is connected by a fluid line 74 which is in turn connected to branch lines 75, 75, leading to the two cylinders 28 by which the tail gate assembly is elevated and lowered. Each of the branch lines 75 has a check valve 77 therein, which opens to allow fluid to flow to the cylinders 28, and a by-pass line 79 provided with a restriction 81 through which back flow of fluid may take place during closing movement of the tail gate assembly when the valves 77 are closed.

Valve 64 is connected to the cylinder assembly 32, by fluid line 76 through which fluid is supplied to move the ejector blade 30 rearwardly and by a fluid line 78 through which fluid is supplied to move the ejector blade forwardly. The fluid line 76 may have a restricting orifice 80, or other suitable device, from which fluid may flow through a by-pass line 82 back to the reservoir 46 to yieldingly resist the return movement of the blade 30 forwardly in the body to allow uniform compression of the refuse from the rear as the vehicle is loaded. Valve assembly 58 is equipped with conventional spring-controlled spools, such that when the operator releases the handle, the valve spools will automatically return to neutral position.

The valve 68 is connected through flow lines 84 and 86 to the fluid motor 26 by which the sweep panel 16 is operated, this valve being of the reversing type whereby the motor 26 may be operated to rotate the sweep panel in either direction.

Valve 70 is connected to the cylinders 24 through flow lines 88 and 90, each of which is branched as seen at 92 and 94 to allow fluid to be supplied to either end of the cylinders 24, while permitting the return of fluid from the other end thereof to swing the ram panel in the desired direction.

Valve assembly 60 is equipped with conventional, detent-type valve spools, which are automatically retained in whatever position they are placed.

The valves 62 and 64 are provided with suitable operating means, such as the handles designated 96 and 98, respectively, and the valves 68 and 70 are similarly provided with the operating means designated 100 and 102, respectively.

In the operation of the equipment the valve 62 will be closed when the handle 96 is in a neutral position, and when the handle 96 is raised from its neutral position valve 62 will be opened to allow fluid to flow from pump 48 through lines 56, 74 and 75 to the cylinders 28, which are of the single acting type, to lift the tail gate assembly 12, and when the handle 96 is moved downwardly from neutral position valve 62 will be opened to allow the return flow of fluid from cylinders 28 to reservoir 46 through restrictions 81 whereby the tail gate assembly may be slowly closed. The check valves 77 and restrictions 81 also prevent the sudden closing of the tail gate assembly in the event that the fluid supply line to cylinders 28 should break.

The valve 64 will also be closed when its handle 98 is in a neutral position, and upon upward movement of the handle the valve will be opened to supply fluid to the cylinder assembly 32 through line 76 and to allow the return of fluid therefrom through line 78 to extend the cylinder to move the ejector blade rearwardly. Upon downward movement of the handle 98 from its neutral position, the valve 64 will be reversed to supply fluid to cylinder 32 through line 78 and to allow return flow therefrom through line 76 to retract the cylinder assembly and move the ejector blade forwardly. When the ejector blade has been moved to its rearmost position, as shown in FIGURE 2, the valve 64 may be moved to closed position, whereupon fluid may flow through line 76, restriction 80 and line 82 back to reservoir 46 to yieldingly resist forward movement of the ejector blade during loading of the vehicle, so that refuse will be compacted uniformly against the ejector blade by the operation of the ram panel as the ejector blade moves forwardly until the body is fully and uniformly loaded.

In the normal operation of the equipment when the sweep and ram panels are to be actuated for the loading of refuse into the vehicle, valves 62 and 64 will be in their neutral positions in which positions fluid from the pump 48 may flow through line 56, valve assembly 58 and line 66 to the valve assembly 60, and upon downward movement of the handle 100 from its neutral position valve 68 will be opened to supply fluid to motor 26 through line 84 and allow return of fluid from the motor through line 86 to rotate the motor to rotate the sweep panel clockwise as illustrated in FIGURES 6, 7 and 8. Upon upward movement of handle 100 from neutral position the flow of fluid through lines 84 and 86 will be reversed to reverse the rotation of motor 26 to turn the sweep blade counter clockwise when desired.

The valve assembly 60 is of the series flow type which permits the flow of fluid through the assembly when the valves 68 and 70 are in their neutral positions, and when valve handle 100 is moved out of neutral position fluid flow is established from line 66 through lines 84 and 86 to rotate the motor 26, such fluid then returning to the reservoir through line 72.

The actuation of the ram panel 20 is accomplished by the cylinders 24 through the operation of valve 70. Thus, upon upward movement of the handle 102 from neutral position, valve 70 will be opened to establish fluid flow through line 90 to cylinders 24 and to allow return flow from the cylinders through line 88 to swing the ram panel forwardly, and upon downward movement of handle 102 from neutral position a reverse flow of fluid through lines 88 and 90 will be established to swing the ram panel rearwardly. The construction of valve assembly 60 is of conventional series design and is such that when valve 70 is moved out of neutral position in combination with the movement of valve 68 out of its neutral position, then fluid flow is directed through the sweep motor 26 and at the same time supplied to the ram panel actuating cylinders 24.

When the sweep motor 26 is at rest the sweep motor valve 68 will be in neutral position, and fluid then by-passes valve 68 and is supplied to the ram panel cylinders 24 to extend the same under the control of valve 70. It is only when the operator moves downwardly both handles 100 and 102, and valves 68 and 70 are both open that fluid may flow to the ram panel cylinders 24 through the sweep motor 26, to retract the ram panel cylinders to swing the ram panel rearwardly, which takes place as the sweep panel moves from the position shown in FIGURE 6 to that shown in FIGURE 8, whereby the rearward movement of the ram panel and the clockwise rotation of the sweep panel are sychronized and accidental contact of the ram panel with the sweep panel during rearward movement of the ram panel is prevented. During such rearward movement of the ram panel 20 and movement of the sweep panel from the load lifting position of FIGURE 6 to the position of FIGURE 7, the pressure of the operating fluid will be divided between the sweep motor 26 and ram panel cylinders 24.

The valve assembly 58 includes a relief valve 59 by which the pressure of fluid supplied to the assembly may be suitably regulated, and the valve assembly 60 is similarly provided with a pressure relief valve 61.

The valve assembly 58 is disposed at some convenient location, such as that shown in FIGURE 1, with the handles 96 and 98 positioned to be easily operated manually by a person standing alongside of the vehicle, whereby the tail gate assembly may be elevated and lowered and the ejector blade 30 suitably traversed for the purpose of unloading the vehicle and placing the same in condition to be reloaded. Valve assembly 60 is preferably positioned on one side of the tail gate assembly 12, as shown in FIGURE 5, with the handles 100 and 102 extending rearwardly in position for easy manipulation by the operator during the loading of the vehicle.

The control mechanism by which the sweep panel and ram panel are operated automatically is illustrated in FIGURES 5, 9 and 10, wherein the sweep panel valve actuating handle 100 and the ram panel motor valve actuating handle 102 are rotatably mounted on a common shaft 104, secured to the exterior of the tail gate as by means of welding as seen at 106. The handle 100 is connected to the sweep panel motor valve 68 by a rod 108 in a manner to cause the motor 26 to be set in operation to rotate the sweep panel 16 clockwise, as viewed in FIGURES 1, 2, 6, 7 and 8, when the handle is moved downwardly and rod 108 is moved upwardly from its neutral position, shown in FIGURE 9, and to cause reversal of the motor 26 upon upward movement of the handle from such neutral position.

Figure 12:
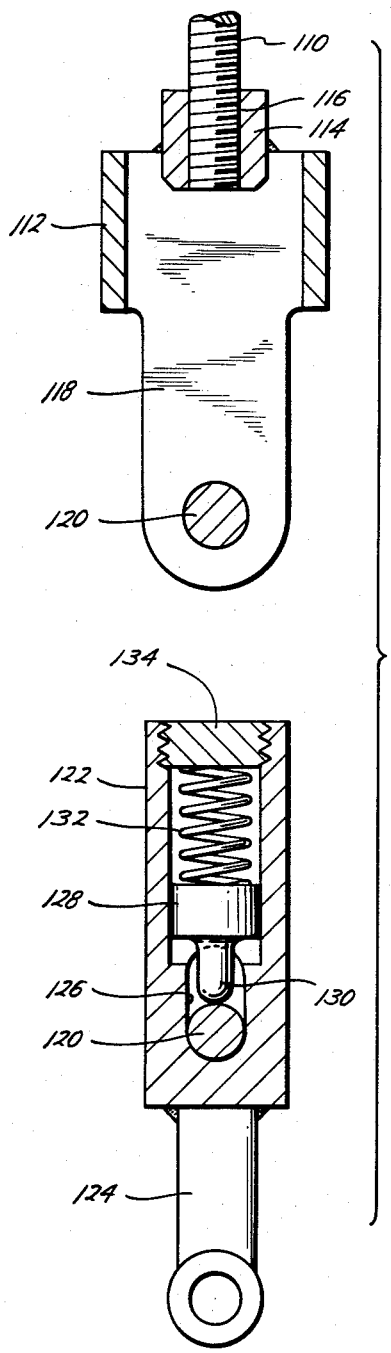
FIGURE 12 is a fragmentary side elevational view, partly in cross-section showing details for construction of a lost motion connection embodied in the operating mechanism of the sweep panel motor control valve.

Handle 102 is likewise connected to the ram panel valve 70 by a rod 110, into which a time delay device, shown in detail in FIGURE 12, is connected in a manner to actuate the valve to cause the ram panel to swing rearwardly subsequent to the downward movement of the handle from neutral position and to cause the panel to swing forwardly upon upward movement of the handle from neutral position. When the sweep and ram panels are at rest the handles 100 and 102 will both be in their neutral positions with valves 68 and 70 closed.

The time delay connection in the rod 110, illustrated in detail in FIGURE 12, comprises a yoke member 112, having a cross-piece 114 welded therein, which has a central, internally threaded opening 116 within which the threaded lower end of rod 110 is screwed. The yoke member 112 has spaced apart downward, extensions 118 provided with perforations through which a cross-pin 120 is extended and secured to the member, as by welding, for movement therewith. The downward extensions 118 of the yoke are disposed exteriorly of a cylinder 122, which extends upwardly between the extensions and which carries at its lower end a short shaft 124 whose lower end is pivotally connected to the handle 100 at a location to be moved downwardly upon downward movement of the handle and upwardly upon upward movement of the same.

The cylinder 122 has diametrically opposite, longitudinally extending slots 126, through which the cross-pin 120 is slidably extended to allow limited relative longitudinal movement between yoke and cylinder and by which the yoke and cylinder are caused to move together longitudinally when the pin engages the cylinder at the ends of the slots. A plunger 128 is movably disposed in the cylinder 122 for longitudinal movement therein and is provided on one side thereof with a central lug or projection 130 positioned for engagement at its free end with the cross-pin 120. The plunger 128 is yieldingly urged toward the cross-pin by a coil spring 132 positioned in the cylinder 122 and which bears at one end against the plunger and at its other end against a screw plug 134 threaded into the upper end of the cylinder and by which the pressure of the spring may be regulated.

A latch lever 136 is pivotally mounted on the shaft 104 which lever has upper and lower arms 138 and 140, respectively, the upper arm 138 being notched at the upper end for engagement with the yoke 112 to hold the yoke against downward movement when the lever is in latching position. At the lower end of its lower arm 140, the lever 136 carries a roller 142 positioned to be engaged by a lug 144 projecting radially from a hub 145 mounted on the sweep panel shaft 18, for rotation with the shaft to move the lever 136 to unlatching position when the sweep panel reaches a predetermined position of its rotational movement, whereupon the return or retracting movement of the ram panel will be initiated in a manner to be hereinafter more fully described.

A lever 146 is also pivotally carried on the shaft 104, which carries at its lower end a roller 148 positioned for engagement with the lug 144 when the sweep panel reaches another predetermined position of its rotational movement. The lever 146 carries a cylinder 150 having a spring pressed plunger 152 whose outer end engages the handle 102 to move the handle with the lever 146 back to neutral position to arrest movement of the sweep panel when the lug 144 engages the roller 148 of the lever 146.

The lever arm 138 also carries a shaft 154 extending horizontally therefrom and which is provided with a knob 156 by which the shaft may be manually operated to unlatch the lever when desired.

An electrical switch 158 is positioned to be operated to close an electric circuit whenever the sweep panel handle 100 or the ram panel handle 102 is moved out of neutral position, which circuit includes a solenoid actuated throttle control device, or other suitable means, by which the engine of the vehicle is caused to accelerate when the sweep or ram panel is to be operated. The switch operating means includes lugs 160 and 162 on the valve rods 108 and 110, respectively, positioned for engagement with a horizontally extending shaft 164 movably supported on a plate 166, suitably attached to the tail gate assembly, as by means of a bolt 168 slidably extended through the plate and provided with a coil spring 170 by which the shaft is yieldingly urged downwardly against the plate. The upper end of the bolt 168 engages the plunger of the switch 158, which may be of the spring pressed type which closes when the plunger is extended. By this arrangement the switch will be closed upon movement of either or both of the handles 100 or 102 out of neutral position to cause speeding up of the vehicle engine when the sweep or ram panel is in operation. The shaft 164 has a knob 172 by which the shaft may be operated manually when it is desired to speed up the engine for any reason.

For the purpose of arresting the movement of the ram panel when it reaches the limit of its movement in either direction, the ram panel carries a shaft 174, pivotally connected at one end thereto and extending rearwardly from the ram panel. This shaft carries spaced apart stop collars 176 and 178 positioned for engagement with one arm 180 of a bell crank whose other arm 182 has a U-shaped slot 184 in which a pin 186 carried by the valve rod 110 is engageable to move the rod in a direction to return the handle 100 to neutral position when the bell crank is actuated by either of the collars 176 or 178, to bring the entire system to rest.

Suitable means, such as a spring pressed latch 187 of a conventional type, illustrated in FIGURES 1, 2, 6, 7 and 8, may be provided, positioned for coaction with the sweep panel 16, to allow the sweep panel to rotate freely in a direction to move the refuse to loading position, but which prevents counter-rotation of the sweep panel when the panel is in its load supporting position as illustrated in FIGURES 1, 2 and 8.

In the operation of the vehicle, assuming that the body has been emptied and the tail gate assembly closed, the sweep panel and ram panel will be in the positions shown in FIGURE 1, the sweep panel being in its refuse supporting position, while the ram panel is at the limit of its forward swinging movement with the lower edge of the ram panel extended inwardly somewhat beyond the sweep panel. In this condition of the apparatus the trough 14 will be open to the rear to receive refuse, the ejector blade 30 being at the limit of its forward movement in the body and the various control valves being in their neutral or closed positions.

Operation of the sweep and ram panel mechanism is initiated by the operator by moving the handles 100 and 102 downwardly simultaneously from their neutral positions. Downward movement of the handle 100 results in upward movement of the valve rod 108, opening the sweep motor valve 68 and causing rotation of the sweep motor in a direction to rotate the sweep panel clockwise as viewed in FIGURE 1.

Upon downward movement of handle 102 the cylinder 122 is moved downwardly relative to the yoke 12, which is held against downward movement by the latch arm 138, resulting in compression of the spring 132 by upward movement of the plunger 128 as the slots 126 move downwardly relative to cross-pin 120. Thus, the sweep panel is set in motion while the ram panel is held stationary.

When the sweep panel has been rotated a predetermined distance to the position illustrated in FIGURE 6, for example, while the ram panel is still at rest, the lug 144 on hub 145, which is rotating with the sweep panel shaft, will be engaged with the roller 142 on the arm 140 of the latch lever to rotate the lever clockwise, as viewed in FIGURE 9, to release the yoke 112 from the latch arm 138, whereupon the yoke will be moved downwardly by the force of the spring 132 to pull the rod 110 downwardly, moving the ram panel control valve 70 to a position to supply fluid to the ram panel cylinders 24 to cause the ram panel to swing rearwardly following the sweep panel. In this manner the sweep panel moves rearwardly ahead of the ram panel which is thus prevented from coming into contact with the sweep panel.

The sweep panel continues to rotate as the ram panel moves toward its retracted position, and when the sweep panel reaches the approximate position shown in FIGURE 7, the ram panel will have reached its fully retracted position. When the ram panel reaches its fully retracted position the collar 178 on the shaft 174 will engage the bell crank arm 180 to rotate the crank to move the arm 182 thereof upwardly, thus moving rod 110 upwardly to return the ram panel control valve to neutral position and arresting further movement of the ram panel.

The sweep panel continues to rotate to lift the refuse out of the trough 14 until the sweep panel reaches the refuse supporting position of FIGURE 8, at which time the projection 144 of hub 145 will engage the roller 148 on arm 146 to rotate the arm clockwise, as viewed in FIGURE 9, whereupon the plunger 152 of the cylinder 150 in engagement with the handle 100 will move the handle upwardly, thus pulling the rod 108 downwardly to move the sweep panel control valve to neutral position and arresting further movement of the sweep panel. When the sweep panel has reached the refuse supporting position of FIGURE 8, it will have moved past the latch 187 which will then be in a position to hold the sweep panel against reverse movement during forward movement of the ram panel.

With the sweep panel thus held in refuse supporting position the packing operation is initiated by upward movement of the handle 100 to open the ram panel control value to supply fluid to the cylinders 24 for forward actuation of the ram panel to move the refuse off of the sweep panel into the body.

When the ram panel reaches the limit of its forward movement the collar 176 on the shaft 174 will be engaged with the bell crank arm 180 to rotate the bell crank counterclockwise, as viewed in FIGURE 9, whereupon the rod 110 will be moved downwardly to return the ram panel control valve to neutral position, thus arresting the movement of the ram panel.

An important characteristic of the invention is that the full pressure of the operating fluid is applied to the particular operation to be performed at the time when such pressure is most needed. In the operation of the sweep panel the pressure of the fluid is applied to the sweep panel motor alone during the movement of the sweep panel from the position shown in FIGURE 7 to that of FIGURE 8 through the trough 14 to lift the refuse out of the trough into a position to be acted upon by the ram panel to compact the refuse in the body. Thus, the ram panel will be at rest during the movement of the sweep panel from the position of FIGURE 7 to that of FIGURE 8, so that the full pressure of the system will be available at that time to lift the refuse out of the trough.

During the forward, refuse compacting movement of the ram panel, the sweep panel will be at rest in its refuse supporting position, so that the full pressure of the system is then applied to the cylinders 24 alone, whereby a maximum compressive force will be exerted on the refuse to most effectively accomplish the packing of the refuse in the body.

Moreover, due to the division of the pressure of the system the sweep panel motor and the ram panel cylinders during the time that the ram panel is being retracted and the sweep panel is being moved into the trough 14, the force exerted on the sweep panel will be diminished, thus greatly reducing the danger of damage to the equipment or injury to the operator due to flying pieces of objects which may become caught and broken between the rear edge of the trough and the sweep panel, as shown at 203 in FIGURE 6.

When the vehicle has been loaded and it is desired to unload the same, the tail gate assembly is raised to the position of FIGURE 2, by moving the valve handle 96 upwardly, after which the handle 98 is moved upwardly to supply fluid to the ejector blade cylinder assembly 32 to move the blade rearwardly to eject the load. After the body has been thus emptied, the handle 98 is moved downwardly to cause retraction of the ejector blade to its forward position in the body and the handle 96 is also moved downwardly to allow the tail gate assembly to close, as hereinbefore described in detail.

The sweep panel and ram panel valves may, of course, be manually operated independently of each other in order to move the panels to any desired position at the will of the operator for the purpose of correcting malfunctioning of the apparatus, such as might be caused by the jamming of refuse in the mechanism, or for other reasons.

The ram panel 20 may be welded to its shaft 22 which is mounted for rotation in end bearings each formed to two separate parts 43 which are releasably secured together and attached to the gate 12 whereby the ram panel may be readily removed and replaced.

It will be appreciated that the construction and arrangement of the parts of the mechanism is subject to various modifications within the spirit of the invention and the scope of the appended claims.

Having thus clearly shown and described the invention, what is claimed as new and desired to secure by Letters Patent is:

1. In a refuse vehicle including a hollow body having a rear end opening, a tail gate movably mounted on the body for movement into and out of closing relation to the opening, a refuse trough carried by the tailgate in position to hold a charge of refuse to be moved from the trough into the body through the opening when the gate is closed, apparatus for transferring refuse from the trough to the body comprising a sweep panel rotatably mounted on a horizontal axis on the tailgate for rotation in one direction through the trough to move refuse from the trough to a supported position on the sweep panel, a ram panel rotatably connected at its upper end to the tail gate for horizontal swinging movement about a horizontal axis on the tailgate above and in vertical alignment with the axis of the sweep panel for movement forwardly across the sweep panel to move refuse from the sweep panel into the body, separate motor means for moving the panels, and means for selectively operating the motor means to rotate the sweep panel in said one direction away from refuse supporting position while the ram panel is in its forwardmost position and to thereafter rotate the sweep panel in said one direction and move said ram panel rearwardly simultaneously until the ram panel reaches said rearmost position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair.

2. In a refuse vehicle including a hollow body having a rear end opening, a tail gate movably mounted on the body for movement into and out of closing relation to the opening, a refuse trough carried by the tailgate in position to hold a charge of refuse to be moved from the trough into the body through the opening when the gate is closed, apparatus for transferring refuse from the trough to the body comprising a sweep panel rotatably mounted on a horizontal axis on the tailgate for rotation in one direction through the trough to move refuse from the trough to a supported position on the sweep panel, a ram panel rotatably connected at its upper end to the tail gate for horizontal swinging movement about a horizontal axis on the tail gate above and in vertical alignment with the axis of the sweep panel for movement forwardly across the sweep panel to move refuse from the sweep panel into the body, separate motor means for moving the panels, and means for selectively operating the motor means to rotate the sweep panel in said one direction away from refuse supporting position while the ram panel is in its forwardmost position and to thereafter rotate the sweep panel in said one direction and move said ram panel rearwardly away from its forwardmost position until the ram panel reaches its rearmost position and the sweep panel reaches said refuse supporting position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair.

3. In a refuse vehicle including a hollow body having a rear end opening, a tail gate hinge means connected to the upper end of the tail gate and connecting the same to the body for vertically swinging movement into and out of closing relation to the opening, a vertically disposed pressure fluid cylinder pivotally connected at its lower end to the body, means forming a connection between said cylinder and said tail gate at a location rearwardly of said hinge means to swing the tail gate vertically upwardly upon actuation of said cylinder, a refuse trough carried by the tail gate in position to hold a charge of refuse to be moved from the trough into the body through the opening when the gate is closed, apparatus for transferring refuse from the trough to the body comprising a sweep panel rotatably mounted on the tail gate for rotation in one direction through the trough to move refuse from the trough to a supported position on the sweep panel, a ram panel movably mounted on the tail gate above the sweep panel for movement forwardly across the sweep panel to move refuse from the sweep panel into the body, means for rotating the sweep panel away from said refuse supporting position prior to rearward movement of the ram panel away from its forwardmost position and means for moving the ram panel forwardly from its rearmost position when said sweep panel is in said refuse supporting position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair.

4. In a refuse vehicle including a hollow body having a rear end opening, a tail gate having a hinged connection at its upper end with the body for vertical swinging movement into and out of closing relation to the opening, vertically disposed pressure fluid means on the body having a connection with the tail gate at a location rearwardly of said hinged connection to swing the tail gate vertically upwardly upon actuation of the fluid pressure means, a refuse trough carried by the tail gate in position to hold a charge of refuse to be moved from the trough into the body through the opening when the gate is closed, apparatus for transferring refuse from the trough to the body comprising a sweep panel rotatably mounted on the tail gate for rotation in one direction through the trough to move refuse from the trough to a supported position on the sweep panel, a ram panel movably mounted on the tail gate above the sweep panel for movement forwardly across the sweep panel to move refuse from the sweep panel into the body, motor means for rotating the sweep panel, motor means for causing swinging movement of said ram panel, means for operating the sweep panel motor means and said ram panel motor means simultaneously during a portion of the movement of said sweep panel away from refuse supporting position and the rearward movement of the ram panel and for preventing rearward movement of the ram panel during another portion of such movements of the sweep and ram panels, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair.

5. In a refuse vehicle including a hollow body having a rear end opening, a tail gate having a hinged connection at its upper end with the body for movement into and out of closing relation to the opening, vertically disposed pressure fluid means on the body having a connection with the tail gate at a location rearwardly of said hinged connection to swing the tail gate vertically upwardly upon actuation of said pressure fluid means, a refuse trough carried by the tail gate in position to hold a charge of refuse to be moved from the trough into the body through the opening when the gate is closed, apparatus for transferring refuse from the trough to the body comprising a sweep panel rotatably mounted on a horizontal axis the tail gate for rotation in one direction through the trough to move refuse from the trough to a supported position on the sweep panel, means for preventing rotation of the sweep panel in the other direction away from refuse supporting position, a ram panel rotatably connected at its upper end to the tail gate above the sweep panel at a location in vertical alignment with said axis for horizontal swinging movement forwardly cross the sweep panel to move refuse from the sweep panel into the body, separate motor means for moving the panels, and means for selectively operating the motor means to rotate the sweep panel in said one direction away from refuse supporting position while said ram panel is in its forwardmost position and to move the ram panel rearwardly when the sweep panel reaches a predetermined position of its rotation away from said supporting position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair.

6. The combination with a refuse vehicle having a hollow body provided with a rear end opening, a tail gate having a hinged connection at its upper end with the body for vertical swinging movement into and out of a position to close said opening, vertically acting pressure fluid means on the body having a connection with said tail gate at a location rearwardly of said hinged connection to swing the tail gate upwardly about the hinged connection to open the tail gate upon actuation of said pressure fluid means an upwardly opening trough carried by the tail gate in position to hold a charge of refuse adjacent said opening when the tail gate is closed, a sweep panel rotatably mounted for rotation about a horizontal axis on the tail gate for rotation about an axis extending longitudinally of the trough in position to rotate in one direction through the trough to move the refuse therefrom and support the same adjacent the opening, a ram panel rotatably supported on the tail gate for swinging movement about a horizontal axis above and in vertical alignment with the axis of the sweep panel forwardly across said sweep panel when the sweep panel is in refuse supporting position to move the refuse from the sweep panel into the body through the opening, a pressure fluid operable motor for rotating the sweep panel and pressure fluid operable means for swinging the ram panel, of a pressure fluid supply system into which said motor and said pressure fluid operable means are connected and means in said system for selectively supplying fluid under pressure to said motor and to said pressure fluid operable means to cause the sweep panel to rotate away from said refuse supporting position prior to rearward movement of said ram panel away from its forwardmost position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair, and a ram shaft panel extending along and attached to one longitudinal edge of the ram panel, bearing means for the ends of the ram panel shaft each formed in separate parts detachably secured together and supported on the upper portion of said tail gate.

7. The combination with a refuse vehicle having a hollow body provided with a rear end opening, a tail gate hingedly connected at its upper end to the body for vertical swinging movement into and out of a position to close said opening, vertically acting pressure fluid means on the body having a connection with the tail gate at a location rearwardly of the hinged connection of the tail gate to the body to cause the tail gate to swing upwardly to open the tail gate upon actuation of said pressure fluid means, an upwardly opening trough carried by the tail gate in position to hold a charge of refuse adjacent said opening when the tail gate is closed, a sweep panel rotatably mounted on the tail gate for rotation about an axis extending longitudinally of the trough in position to rotate in one direction through the trough to move the refuse therefrom and support the same adjacent the opening, a ram panel rotatably supported on the tail gate for swinging movement about a horizontal axis above and in vertical alignment with the axis of the sweep panel forwardly across said sweep panel when the sweep panel is in refuse supporting position to move the refuse from the sweep panel into the body through the opening, a pressure fluid operable motor for rotating the sweep panel and pressure fluid operable means for swinging the ram panel, of a pressure fluid supply system into which said motor and said pressure fluid operable means are connected and means in said system for selectively supplying fluid under pressure to said motor and said pressure fluid operable means to cause the sweep panel to rotate away from said refuse supporting position prior to rearward movement of said ram panel rearwardly away from its forwardmost position and to cause forward swinging movement of said ram panel when said sweep panel is in said refuse supporting position, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair, and a ram shaft panel extending along and attached to one longitudinal edge of the ram panel, bearing means for the ends of the ram panel shaft each formed in separate parts detachably secured together and supported on the upper portion of said tail gate.

8. In a refuse vehicle a hollow body having a rear end opening, a tail gate movably mounted on the body for movement into and out of a position to close the opening, said gate having an upper portion hingedly connected to the body to support the gate for vertical swinging movement and a lower portion detachably secured to the upper portion and forming an upwardly opening trough positioned to hold a charge of refuse adjacent said opening when the gate is closed, vertically acting pressure fluid means on the body having a connection with the tail gate at a loaction rearwardly of the hinged connection of the tail gate to cause the tail gate to swing upwardly to open the tail gate upon actuation of the pressure fluid means a sweep panel, a shaft extending along and attached to one longitudinal edge of the sweep panel, bearing means for the ends of the shaft each formed in separate parts attached to said upper and lower portions to support the sweep panel for rotation with the shaft about an axis extending longitudinally of the trough to lift refuse from the trough and support the same adjacent the lower edge of the opening, and a ram panel movably supported on the gate for forward movement across the sweep panel when the sweep panel is in refuse supporting position to move refuse off of the sweep panel forwardly into the body, said tail gate being formed of upper and lower detachable portions, the lower of which comprises said refuse trough, and the ram panel being mounted in said upper portion, a shaft extending along and attached to one longitudinal edge of the sweep panel and bearing means for the ends of the shaft, each formed in separate parts attached to said upper and lower portions of said tail gate to support the sweep panel shaft for rotation with the shaft, whereby said sweep panel and shaft may be removed as a unit from the tail gate for replacement or repair, and a ram shaft panel extending along and attached to one longitudinal edge of the ram panel, bearing means for the ends of the ram panel shaft each formed in separate parts detachably secured together and supported on the upper portion of said tail gate.

9. In a refuse vehicle a hollow body having a rear end opening, a tail gate movably mounted on the body for movement into and out of a position to close the opening, said gate having an upper portion hingedly connected to the body to support the gate for vertical swinging movement and a lower portion detachably secured to the upper portion and forming an upwardly opening trough positioned to hold a change of refuse adjacent said opening when the gate is closed, a sweep panel, a shaft extending along and attached to one longitudinal edge of the sweep panel, bearing means for the ends of the shaft each formed in separate parts attached to said upper and lower portions to support the sweep panel for rotation with the shaft about an axis extending longitudinally of the trough to lift refuse from the trough and support the same adjacent the lower elge of the opening, a ram panel, a ram panel shaft extending along and attached to one longitudinal edge of the ram panel, bearing means for the ends of the ram panel shaft each formed in separate parts detachably secured together and supported on said upper portion to support the ram panel for forward and rearward movement across said sweep panel when the sweep panel is in refuse supporting position.

10. In a refuse vehicle a hollow body having a rear end opening, a tail gate movably mounted on the body for movement into and out of a position to close the opening, said gate having an upper portion hingedly connected to the body to support the gate for vertical swinging movement and a lower portion detachably secured to the upper portion and forming an upwardly opening trough positioned to hold a charge of refuse adjacent said opening when the gate is closed, a sweep panel, a shaft extending along and attached to one longitudinal edge of the sweep panel, bearing means formed in separate parts on said upper and lower portions at the ends of said trough positioned for coaction with shaft when said portions are assembled to support the sweep panel for rotation about an axis extending longitudinally of the trough to lift refuse from the trough and support the same adjacent the lower edge of the opening and to be disengaged from the shaft when said portions are detached to allow the shaft and sweep panel to be removed as a unit from the gate.

References Cited by the Examiner

UNITED STATES PATENTS

| | | | |
|---|---|---|---|
| Re. 25,577 | 5/1964 | Coleman et al. | 214—83.3 |
| 2,335,155 | 11/1943 | Lee | 214—83.3 |
| 2,837,230 | 6/1958 | Hereterich | 214—503 |
| 2,879,906 | 3/1959 | Gwinn | 214—503 X |
| 3,049,256 | 8/1962 | Urban | 214—518 |
| 3,083,849 | 4/1963 | Mottin | 214—82 X |

FOREIGN PATENTS

| | | |
|---|---|---|
| 836,618 | 4/1952 | Germany. |

GERALD M. FORLENZA, *Primary Examiner*,

A. J. MAKAY, *Assistant Examiner*.